United States Patent [19]
Dallen

[11] 3,766,698
[45] Oct. 23, 1973

[54] MEANS FOR PREVENTING PANEL ROLL OUT IN A PANEL MOUNTING SYSTEM

[75] Inventor: John A. Dallen, Port Clinton, Ohio
[73] Assignee: The Standard Products Company, Cleveland, Ohio
[22] Filed: Aug. 23, 1971
[21] Appl. No.: 173,967

[52] U.S. Cl............ 52/400, 52/208, 52/235, 52/403, 52/627
[51] Int. Cl................................ E06b 1/40
[58] Field of Search............. 52/400, 214, 627, 52/628, 573, 208, 281, 282, 235, 393, 395, 397, 402, 403, 716; 49/482, 479, 504, 381

[56] References Cited
UNITED STATES PATENTS

| | | | |
|---|---|---|---|
| 3,336,707 | 8/1967 | Horgan, Jr. | 52/235 |
| 3,342,000 | 9/1967 | Cripe | 52/281 |
| 2,078,731 | 4/1937 | Norris | 52/400 |
| 3,680,276 | 8/1972 | Wright et al. | 52/400 |
| 2,208,836 | 7/1940 | Edwards | 52/400 |
| 3,028,938 | 4/1962 | Schorr | 52/400 |
| 939,592 | 11/1909 | Farquhar | 52/395 |
| 3,604,171 | 9/1971 | Perilstein | 52/400 |
| 3,004,305 | 10/1961 | Goodemote et al. | 52/402 |

FOREIGN PATENTS OR APPLICATIONS

| | | | |
|---|---|---|---|
| 1,440,022 | 4/1966 | France | 52/214 |
| 659,716 | 3/1963 | Canada | 52/393 |

Primary Examiner—Frank L. Abbott
Assistant Examiner—Leslie A. Braun
Attorney—James H. Tilberry et al.

[57] ABSTRACT

Means are provided for preventing panel roll out in panel mounting systems for building wall openings or the like wherein elastomeric gasket members, including panel receiving channels therein are mounted about the openings for sealingly receiving construction panels. The gasket members include resilient portions defining the receiving channels which deflect out of the desired panel receiving position when the panels themselves are subjected to high lateral forces. The roll out prevention means comprises a plurality of rigid bracket members spaced along and affixed so as to closely embrace a portion of the outside of the gaskets in order to retain the resilient positions in the desired panel sealing condition. Elongated bolts or other suitable fasteners are used to retain the brackets in position on the gaskets and may also aid in retaining the gaskets themselves in position relative to the openings.

4 Claims, 7 Drawing Figures

Patented Oct. 23, 1973
3,766,698
2 Sheets-Sheet 1
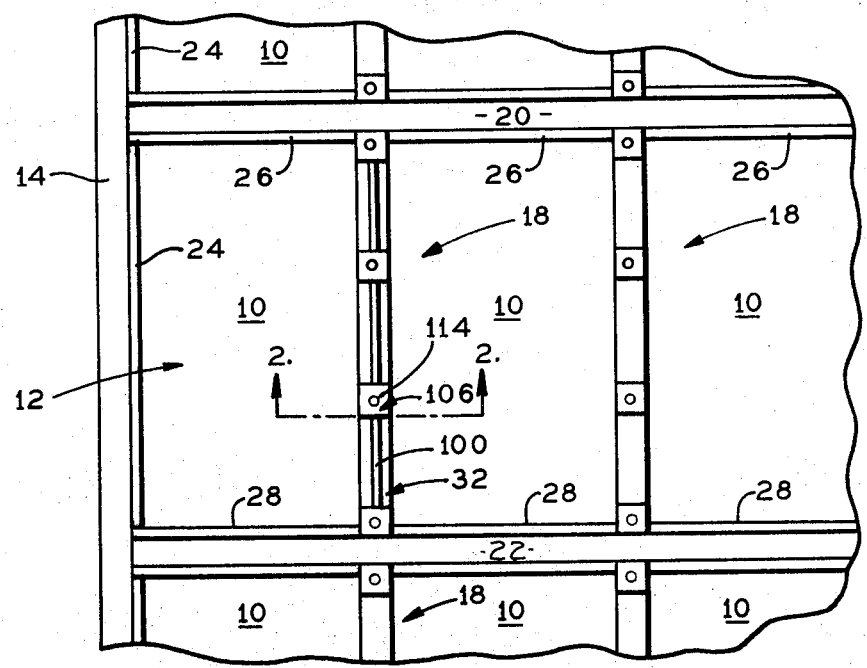
Fig. 1.
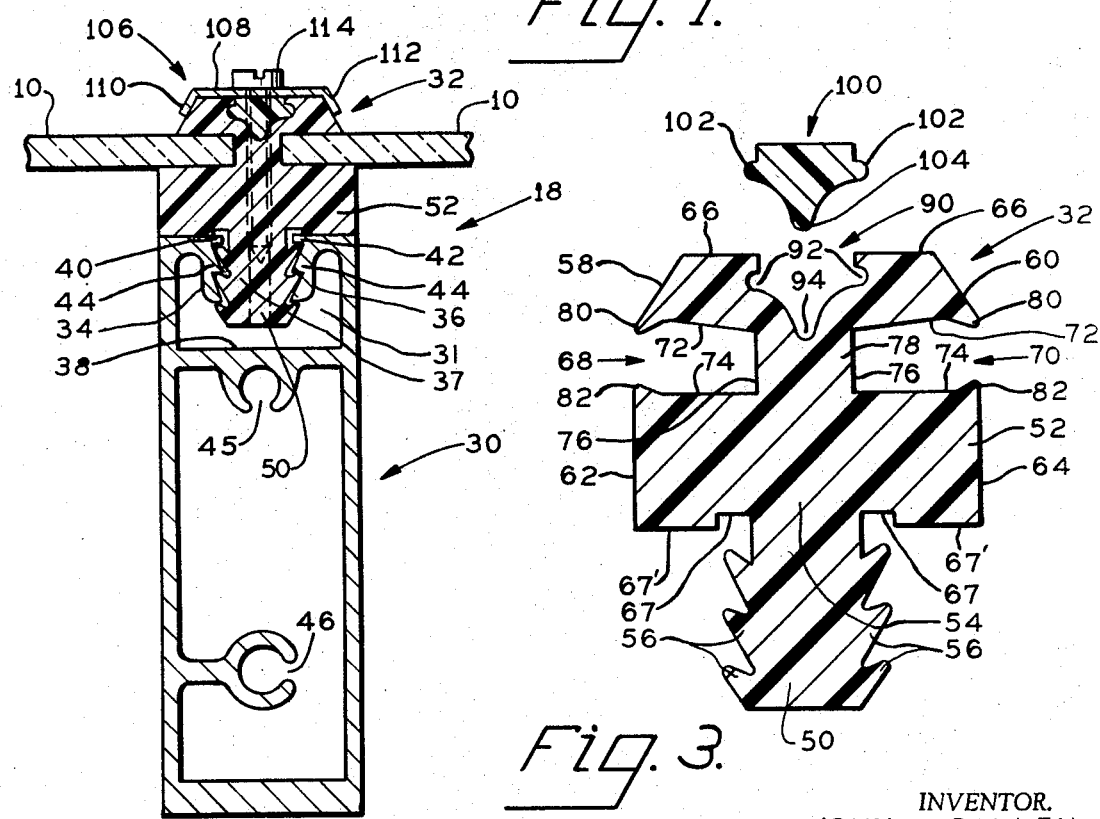
Fig. 2.
Fig. 3.
INVENTOR.
JOHN A. DALLEN
BY
Meyer, Tilberry & Body
ATTORNEYS.

Patented Oct. 23, 1973
3,766,698
2 Sheets-Sheet 2
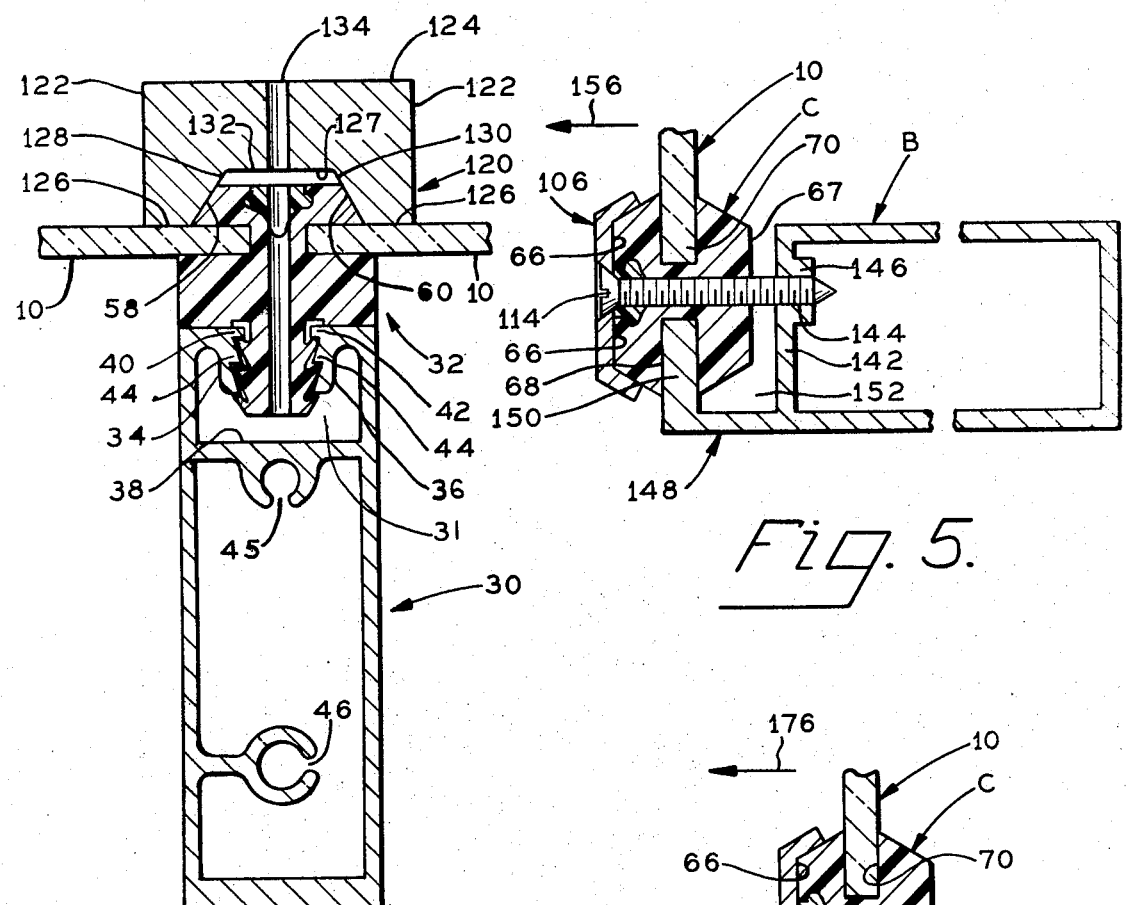
Fig. 4.
Fig. 5.
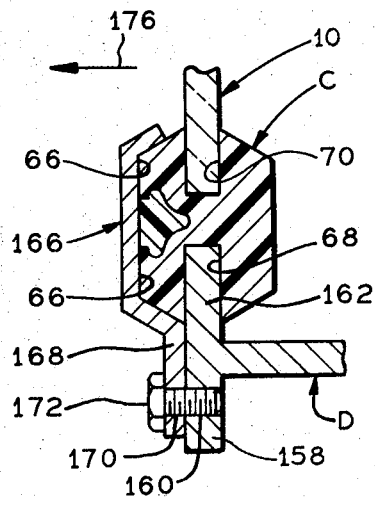
Fig. 6.
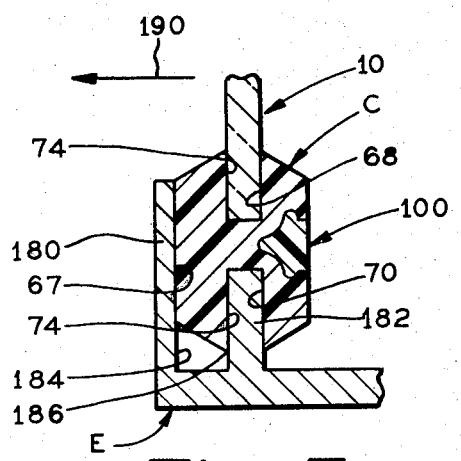
Fig. 7.
INVENTOR.
JOHN A. DALLEN
BY
Meyer, Tilberry & Body
ATTORNEYS.

MEANS FOR PREVENTING PANEL ROLL OUT IN A PANEL MOUNTING SYSTEM

This application pertains to the art of panel mounting systems and more particularly to mounting systems for large construction panels which are subject to substantial lateral forces.

The present invention is particularly applicable to window mounting systems wherein an elastomeric gasket member surrounds a window opening and has a continuous groove therein for receiving the edges of the associated window panel, and wherein at least one mullion structural member and a cooperating narrow gasket extend transversely across the opening to divide it into a series of openings. Although the invention will be described with particular reference to such a system, it will be appreciated that the invention has broader applications and may be employed whenever it is desirous of mounting construction panels using narrow elastomeric gaskets, including the horizontal and vertical perimeter of a bay, as well as the horizontal and vertical muntins. The invention may be used with strip gaskets, ladder gaskets or grid gaskets. Ladder gaskets include a continuous periphery of rectangular or other shape, and integral muntin cross members extending in only one direction, either horizontal or vertical, in parallel relationship. Grid gaskets include a continuous periphery of rectangular or other shape, and integral muntin cross members extending both horizontal and vertical, and integrally intersecting one another. The present invention may be used anywhere with strip gaskets, and on the periphery or muntin cross members of ladder and grid gaskets.

Fairly recent developments in the construction industry in the way of materials and designs have revolutionized building construction. That is, and particularly with reference to multi-story commercial buildings, the focus has been to simplify and beautify the buildings by, for example, using on-site poured or prefabricated concrete wall panels or wall panels constructed of a variety of other materials. These wall panels are affixed to the structural skeleton of the building in any of several ways and subsequently, window panels are mounted relative to window openings in the wall panels by elastomeric gasket members mounted about the openings.

In certain building designs, it has been desired to have the window areas span substantially all of the outer wall area. To accomplish this type of construction, extremely large window panels are employed and disposed in adjacent coplanar relationships relative to each other. Oftentimes, these panels are of a heighth sufficient to extend vertically between one or more stories of the building and are many feet in width. In this type of desired construction, rigid mullion structural members and associated elastomeric gaskets, which are most advantageously of a narrow width, are employed to join and seal adjacent panel edges. The mullion structural members and gaskets define mullion areas. To provide these narrow mullion areas, various designs of mullion structural members and gaskets have been employed, including those in which the gaskets have spaced lips defining oppositely facing channels which receive the adjacent edges of two coplanar panels.

One difficulty encountered with these previous designs has been that the elastomeric gaskets have not been sufficiently rigid to retain the window panels in place when high negative lateral forces act against the panels. The sides of the panel receiving channels in the gasket members are essentially only flexible lips which are biased against the panels to retain them in position. Because of their resilient nature, the outside of these lips may flex outwardly from contact with the panels if a substantial negative lateral force is applied against the panels. The end result is "panel roll out." "Panel roll out" is a term of art employed to denote a condition wherein a construction panel is forced from the desired tight sealing relationship with the gaskets by negative forces acting thereon. The result of panel roll out is leaky and inefficient window seals as well as broken or blown out panels which, obviously, are undesirable in any building structure because of the possible personal and property damage, and the substantial repair and replacement costs involved.

Another problem incurred with the previous narrow mullion strip areas has been fastening of the gasket member to the rigid mullion tube or structural member. The mullion tubes have included a continuous channel facing outwardly generally normal to the plane of the window opening and adapted to receive a tongue-like portion formed integral with the gasket member. Roll out may also occur at the periphery or muntin area of ladder and grid type gaskets.

The present invention contemplates means for preventing panel roll out, which means overcomes all of the above referred problems and others, and is simple to manufacture, easy to use, and readily adaptable to any building design requiring gasket members for mounting construction panels.

In accordance with the present invention, there is provided locking means for locking the lips defining the panel receiving channels of the gasket members in position relative to the associated window panels or other structural members. The locking means comprises a plurality of rigid bracket members disposed on the gasket members at spaced intervals and including a portion which extends over at least a portion of the outside lips (including substantially the entire width of the outermost edge of the gasket members) to retain them in a tight-fitting sealing relationship with the associated window panels.

In accordance with another aspect of the present invention, there is provided for use with a gasket member having a pair of oppositely facing channels to receive both the adjacent edges of two coplanar panels, a tongue-like portion adapted to be closely received in an outwardly opening channel in a narrow mullion structural member, and a bracket including a portion which extends over at least a portion of the opposed outside lips defining the channel including substantially the entire width of the outermost edge of the gasket member.

In accordance with a limited aspect of the present invention, the brackets are affixed to the gasket members by mechanical fasteners which extend through the gasket members at least into the tongue-like portions.

The principal object of the present invention is the provision of means for preventing panel roll out in a panel mounting system.

Another object of the present invention is the provision of means for preventing panel roll out in a panel mounting system which is easily assembled.

Yet another object of the present invention is the provision of means for preventing panel roll out in a panel mounting system which aids in retaining a gasket member in position relative to a mullion structural member.

Still another object of the present invention is the provision of means for preventing panel roll out in a panel mounting system which is readily adaptable to a variety of different mounting systems employing elastomeric panel receiving and mounting gaskets.

The invention may take physical form in certain parts and arrangements of parts, a preferred embodiment of which will be described in detail in the specification and illustrated in the accompanying drawings which form a part hereof and wherein:

FIG. 1 is a partial elevational view of a building having large window panels mounted therein and using the subject invention;

FIG. 2 is a cross sectional view taken along lines 2—2 in FIG. 1;

FIG. 3 is a cross sectional view of the sealing gasket and locking strip used in the embodiment shown in FIG. 2;

FIG. 4 is a cross sectional view similar to FIG. 2 showing the drill guide used in implementing the subject invention;

FIG. 5 is a cross sectional view similar to FIG. 2 showing another embodiment;

FIG. 6 is a cross sectional view similar to FIGS. 2 and 5 showing another embodiment; and FIG. 7 is a cross sectional view similar to FIGS. 2, 5 and 6 showing another embodiment.

Referring now to the drawings wherein the showings are for the purposes of illustrating a preferred embodiment of the invention only, and not for purposes of limiting same, the FIGURES show a plurality of window panels 10 mounted to form the outside wall 12 of a multi-story building. In FIG. 1, wall 12 includes a corner area 14. A plurality of mullion areas generally designated 18 extend transversely across the opening between consecutive floors 20,22 of the building in a generally vertical direction. Floors 20,22 may be constructed in any known manner and oftentimes include poured concrete panels at least at the extremities thereof and similarly, the members comprising corner area 14 are also oftentimes poured concrete. In the preferred embodiment, it will be appreciated that the intention is to present as much window panel area on wall 12 as possible. It will also be appreciated that the number of mullion areas 18 required is independent upon the particular dimensions of the building and window panels. The mounting systems for the outside edges and top and bottom edges of panels 10 are generally shown by numerals 24,26 and 28 respectively. It is to be understood that these systems may be of the type hereinafter described or of any other type generally associated with mounting the edges of window or construction panels in buildings and using elastomeric gasket members. The other mounting systems which may be associated with these edges do not form a part of the present invention and are therefore not specifically described therein. The subject invention is adaptable for use with any of these systems as will hereinafter become apparent.

More specifically and with reference to one of mullion areas 18, it being understood that the other mullion areas are identical thereto unless otherwise specifically noted, it will be seen from FIGS. 1 and 2 that the mullion area is comprised of an elongated mullion structural member generally designated 30 and an elongated elastomeric muntin gasket generally designated 32. Mullion structural member 30 has a reglet portion 31 and may be comprised of any relatively rigid material and, in the preferred embodiment, comprises an extruded aluminum element. Reglet portion 31 of mullion structural member 30 includes a pair of spaced apart opposed side wall portions 34,36 defining an opening 37, and an integral bottom wall portion 38. Side wall portions 34,36 include shoulders or lips 40,42 located on opposite sides of opening 37, and a plurality of inwardly extending protrusions 44 for engagement with receiving gasket 32 as will hereinafter be more fully described. It is to be appreciated that the mullion structural member may be of any suitable design and may comprise a heavy beam member, it merely being necessary that the channel area is included therein. In the arrangement shown, mullion structural member 30 includes fastener chases 45 and 46 for receiving fasteners to tie a system together. Although the section for FIGURE 2 has been taken at a vertical muntin, it will be appreciated that the features of the present invention may also be used at horizontal muntins, as well as the periphery of bays, and at the periphery of ladder or grid gaskets.

mounting gasket member 32 is comprised of a first or tongue portion 50 interconnected to a second or body portion 52 by a neck portion 54. In the preferred embodiment of the subject invention, the mounting gasket is an extruded elastomeric material such as, for example, neoprene. Extending lateraly outward from the sides of first or tongue portion 50 are a plurality of protrusions 56 for engagement with protrusions 44 on portion 31 of mullion structural member 30 as will hereinafter be more fully described. The second or body portion of the gasket includes longitudinally extending upper sides 58,60, lower sides 62,64, top areas 66 and bottom areas 67 having shoulders 67'. Disposed between sides 58,62 and 60,64 are a pair of panel receiving channels generally designated 68,70 respectively. These channels also extend longitudinally along the gasket and are coextensive therewith. Surfaces 58,60 converge from the channels toward top areas 66, and surfaces 62,64 extend in substantially common planes with the outer surfaces of walls 34 and 36 on reglet portion 31 of mullion structural member 30. Each of the receiving channels includes side wall portions 72, 74 and a bottom wall portion 76. It should be noted, and as best shown in FIG. 3, that side wall portions 72 diverge from the bottom wall toward the open ends thereof. This is to facilitate ease of panel mounting as will hereinafter be more fully described. The bottom walls of the channels are spaced apart by a rib-like area 78. Each channel also includes an upper sealing lip 80 along the outer edge of side wall 72 and a lower sealing lip 82 along the outer edge of said wall 74. These sealing lips face inwardly into the channels toward each other. Sealing lips 80,82 aid in gripping the window panels when they are disposed in the panel receiving channels as will hereinafter be more fully described.

A locking strip receiving groove generally designated 90 extends longitudinally along top areas 66 of the mounting gasket and includes therein a pair of laterally extending protrusion receiving areas 92 and a downwardly extending protrusion receiving area 94. Locking strip receiving groove 90 is adapted to receive, in a tight-fitting relationship, a locking strip generally designated 100 also formed from an elastomeric material such as neoprene. Top areas 66, and locking strip 100 when in place, comprise the "outermost edge" of the embodiment shown in the drawings, as the quoted term is used in the claims. The locking strip includes a pair of laterally extending protrusions 102 and a downwardly extending protrusion 104. Locking strip 100 is dimensioned so that protrusions 102,104 are closely received in protrusion receiving areas 92,94 of the locking strip receiving groove. When the locking strip is received in the locking strip receiving groove, side wall portions 72 of the receiving channels are arcuately biased toward side wall portions 74 in order that the channels, including upper and lower sealing lips 80,82 are forced into a tight-fitting relationship with the associated window panels. It should be here noted that the specific design of the mounting gasket, including tongue 50 and locking strip 100 are known in the art.

In using the above described panel mounting system, reference will only be made relative to mounting two adjacent panels, it being understood that the other mountings are identical thereto unless otherwise noted. It is first necessary to make arrangements for sealing the outside edges 24, top edges 26 and bottom edges 28 of window panels 10 as hereinabove previously mentioned. Mullion structural member 30 may then be disposed to extend transversely between floors 20,22 in a generally horizontal or vertical direction. The channel area defined by side wall portions 34,36 and bottom wall portion 38 is disposed to open outwardly transverse to the plane of wall 12. Once the mullion structural member is in position, a strip gasket, or a ladder or grid gasket which includes muntin 32, may be positioned with muntin 32 extending longitudinally along the entire length of mullion structural member 30.

The muntin gasket is located relative to the reglet by inserting first or tongue portion 50 into the reglet channel area so that protrusions 56 of the first or base portion engage protrusions 44 on side wall portions 34,36 of the reglet. This engagement is best shown in FIG. 2, and as may therein be seen, the upward direction of protrusions 56 and the downward direction of protrusions 44 further enhance the relative gripping relationship between them. When the gasket is fully inserted into the channel area, shoulders 67' of bottom surfaces 67 rest against lips or shoulders 40,42 of the reglet portion of mullion structural member 30.

Once the gasket is received in the reglet of mullion structural member 30, the adjacent window panels 10 may be inserted into receiving channels 68,70 respectively by merely temporarily deforming the gasket by bending side wall portions 72 in an outwardly direction until the panels are received therein. Once the panels are located in the receiving channels, it is necessary to place side wall portions 72,74 in a tight-fitting relationship relative to the panels in order to secure them in the desired position. For this purpose, locking strip 100 is inserted into locking strip receiving groove 90 in a known fashion, such as for example, by the use of a locking strip inserting tool designed for and generally associated for use with this type of gasket. The insertion of the locking strip causes side walls 72 to be arcuately forced toward side walls 74 and upper and lower sealing lips 80,82 to be outwardly biased in a sealing relationship against the panels.

Because the gasket member is constructed from an elastomeric material, and even with the locking strip in position, it is possible to move sides 58,60 outwardly so that side wall portions 72 are no longer in the tight-fitting relationship with the associated window panels. This problem is, and as hereinabove discussed, not realized until a severe negative lateral force of the magnitude and type generated during a severe storm acts on the panels. This type of force does not have the effect of pushing the window panels in, but rather, has the effect of forcing the window panels on the opposite side of the building outwardly. With these severe forces, the resilient retaining forces provided by sides 58,60 are overcome so that the panels are essentially "rolled out" of their mounted positions. The result, of course, is broken mounting seals and even broken or blown out panels.

To overcome this problem and to add further stability to the above described structure, a plurality of locking means generally designated 106 in FIGS. 1 and 2 are received along mullion areas 18 and along the perimeter areas of the system. In the preferred embodiment, each locking means comprises a bracket member suitably stamped, or extruded and cut, or otherwise formed from a relatively light, rigid metal to include a base surface 108 adapted to closely embrace top area 66 and sealing strip 100 of the gasket member, and side surfaces 110,112 adapted to closely embrace a portion of converging side surfaces 58,60 respectively. A mechanical fastener generally designated 114 passes through each bracket, the locking strip and into second or body portion 52 of the receiving gasket. In the preferred embodiment, a small starting hole, as will hereinafter be more fully described, is first drilled at the desired spaced locations for brackets 106 along the muntin gasket. Fastener 114 may comprise a self-threading screw, a barbed fastener, an expansion fastener, or any other suitable fastener, which is received in the previously formed starting hole and, as the fastener passes into first or tongue portion 50, it has the effect of forcing the sides of the tongue into a tight-fitting relationship with side walls 34,36. In a preferred arrangement, fastener 114 extends completely through tongue portion 50, although it will be appreciated that it could terminate within tongue portion 50. In addition, it is not always necessary to first drill a hole through gasket 32 for receiving the fastener, as the fastener may be driven to form its own hole.

As base 108 and side surfaces 110,112 closely embrace the corresponding surfaces of the muntin gasket, the effect of tightly securing each bracket to the receiving gasket is to assure retention of the locking strip in the locking strip receiving groove in a tight-fitting manner and to add rigidity to the top area of the gasket to prevent separation of side wall portions 72 from contact with the panels. As side surfaces 110,112 extend only partially over sides 58,60 of the gasket, there is assurance that only the elastomeric gasket will actually contact panels 10.

It will be appreciated that any number of these brackets can be utilized with gasket 32, or with the periphery of a gasket system, it merely being necessary to provide a sufficient number to retain the gasket in the desired mounting and sealing condition as dictated by the specific design requirements. It would therefore be possible to use a single bracket extending over the entire length of gasket if so desired, although this usage is not the most preferred. The spaced-apart brackets are of more than adequate strength to withstand the negative pressures exerted by even the most severe storms or winds. It should be noted that this added strength is not only achieved in the tongue and groove type of muntin gasket, but is also achieved in other types of gasket mountings.

FIG. 4 shows the arrangement employed for drilling the starting hole for fastener 114 and comprises a drill guide generally designated 120. This drill guide has opposed side portions 122, top portion 124 and bottom portion 126. Extending along the bottom portion is a passage area generally designated 127 having passage area side walls 128,130 and passage area top wall 132. As previously noted, upper sides 58,60 converge toward each other from receiving grooves 68,70 to top area 66 and passage area side walls 128,130 are therefore dimensioned to diverge from passage area bottom wall 132 at generally identical angles relative thereto. Generally centrally located in drill guide 120 in a drill guide hole 134 of slightly a larger diameter than the drill to be used in drilling the starting hole.

In using this drill guide, it is merely placed over the assembled mounting gasket where desired so that side walls 120,130 closely embrace walls 58,60 of the gasket, with bottom surface 126 resting against the adjacent window panels. In this position, a drill (not shown) may be passed through guide hole 134 and into gasket 32 through locking strip 100. The use of this drill guide permits the establishment of consistent mountings for brackets 106 and assures that window panels 10 or the gasket will not be damaged by preventing misalignment of the drill.

FIG. 5 shows another arrangement wherein a structural member B includes a wall portion 142 having a hole 144 therethrough at a second area 146. Structural member B includes a substantially L-shaped flange 148 having a flange 150 extending substantially parallel to wall 142. Wall 142 and flange 150 are in spaced-apart relationship to define a space 152 therebetween. An elastomeric gasket member C, which may be of identical construction as gasket 32 of FIG. 3 except for the omission of tongue 50 and neck 54, as flange 150 received in channel 68 and panel 10 received in channel 70. In the arrangement shown, bottom surface 67 of gasket C is spaced from the facing surface of wall 142. Fastener 114 extends through gasket C into hole 144 for tightly securing bracket 106 against surfaces 66 of gasket C. Fastener 114 may be threaded to cooperate with threads formed in hole 144, although it will be appreciated that barbed or expansion fasteners, or any other suitable fasteners, may be used. It will be recognized that this arrangement securely holds gasket C to flange 150 and panel 10 to gasket C under the action of negative pressure acting in the direction of arrow 156.

FIG. 6 shows another arrangement wherein structural member D has a flange 158 with a hold 160 therethrough. Another flange 162 on structural member D is received in channel 68 of gasket member C, while panel 10 is received in channel 70 of gasket C. A slightly modified form of bracket member 166 includes an extended mounting portion 168 having a hole 170 therethrough. A fastener 172 extends through hole 170 into hole 160 for securely clamping bracket 166 against surfaces 66 of gasket member C. Fastener 172 may thread into hole 160, or may be otherwise retained therein in a known manner. Negative forces acting in the direction of arrow 176 on panel 10 will not pull panel 10 from gasket C, or pull gasket C from flange 162, because bracket 166 firmly holds the system togther.

In accordance with another arrangement, a structural member E may include a pair of parallel spaced-apart flanges 180 and 182. Channel 70 of gasket member C receives flange 182, while channel 68 receives the edge of panel 10. The distance between facing surfaces 184 and 186 of flanges 180 and 182 may be approximately equal to the distance between surfaces 67 and 74 so that the lips on gasket member C will be tightly wedged between flanges 180 and 182. In the arrangement shown in this figure, gasket member C is reversely positioned with respect to the arrangements of FIGS. 2, 5 and 6 so that lock strip 100 is on the inside of the wall. Negative pressure forces acting on panel 10 in the direction of arrow 190 will not cause deformation of the lips on gasket C to cause roll out because flange 180 securely holds gasket C in position to prevent such action. In the arrangement of FIG. 7, it will be recognized that it is also possible to use a fastener which could extend through gasket C and be secured to flange 180.

The invention has been described with reference to the preferred embodiment. Obviously, modifications and alterations will occur to others upon the reading and understanding of this specification. It is my intention to include all such modifications and alterations insofar as they come within the scope of the appended claims or the equivalents thereof.

Having thus defined my invention, I now claim:

1. In a panel mounting system particularly adapted for mounting panels in building wall openings wherein an elongated elastomeric panel mounting and sealing gasket is fastened to a rigid structural member of said building by means of a first tongue portion of said gasket which is engaged by a gasket receiving channel in said structural member, said gasket having a second portion which contains at least one continuous panel receiving channel opening therein, said gasket being disposed about a portion of said opening with said channel opening defining a panel mounting plane generally parallel with the plane of said channel opening, said gasket having at least one resilient side wall portion adjacent said receiving channel and disposed remote from said channel opening form the outermost edge of said gasket member, said resilient side wall portion being capable of being temporarily deformed sufficiently to receive the edges of a relatively rigid thin walled construction panel within said panel receiving channel and thereafter to maintain said panel therein, the improvement comprising:

means for locking said resilient side wall in a panel retaining relationship with the edges of said panels, said locking means including at least one rigid bracket member disposed over at least said outermost edge of said gasket member and connected to an elongated mechanical fastener which is inserted into said first tongue portion of said gasket within said gasket receiving channel to hold said bracket in said panel retaining relationship and to force said tongue portion of said gasket into a tight fitting relationship with said gasket receiving channel of said structural member.

2. The improvement as defined in claim 1 wherein said at least one bracket member comprises a plurality of said bracket members spaced at intervals along said gasket member.

3. The improvement as defined in claim 1 wherein said gasket second portion includes a pair of opposed, outwardly opening panel receiving channels each having a resilient side wall portion, said side wall portions defining the outermost edge of said second portion, said brackets being dimensioned to closely embrace at least said outermost edge.

4. The improvement as defined in claim 3 wherein one of said pair of channels serve as a structural member receiving channel for receiving a flange portion of said rigid structural member disposed along at least a portion of said opening, said elongated mechanical fastener being affixed to said structural member.

* * * * *